UNITED STATES PATENT OFFICE.

LOUIS COLLARDON, OF WEST BROMWICH, ENGLAND.

ANTIFOULING PAINT AND VARNISH.

1,105,619. Specification of Letters Patent. Patented Aug. 4, 1914.

No Drawing. Application filed January 20, 1913. Serial No. 743,201.

*To all whom it may concern:*

Be it known that I, LOUIS COLLARDON, a citizen of Argentina, residing at 73 Bratt street, West Bromwich, in the county of Warwickshire, England, have invented new and useful Improvements in Antifouling Paints and Varnishes, of which the following is a specification.

This invention relates to anti-fouling paints and varnishes.

The paints and varnishes of the present invention consist essentially of condensation products obtained by the action of formaldehyde or para-formaldehyde on carbolic acid or other suitable phenol (including cresols and the like) with suitable solvents, and with poisonous salts in intimate combination therewith.

According to the present invention one or more cellulose esters of the fatty acid series is or are mixed with such condensation products and to this mixture is added a solvent which will dissolve both the condensation product and the cellulose compound or compounds. The product thus obtained serves as a base of either a paint or varnish. In the case of a paint a compound of a poisonous nature is added and in the case of a varnish, (and this may also be so in the case of certain paints,) a bleaching compound is added. If desired, as has been previously proposed in the case of paints or varnishes, resins other than colophony, and rubber or rubber-like substances may also be added.

A paint in accordance with the present invention may be prepared in the following manner: Carbolic acid or other suitable phenol is mixed with organic or inorganic compounds of a poisonous nature, such as mercury or arsenic compounds, and to these are added an equal quantity of formaldehyde or para-formaldehyde and the necessary quantity of water. The resulting mixture is heated in a closed vessel and is well stirred during the heating. After the lapse of a certain time, in the majority of cases two hours, a soft and sticky condensate of resinous nature will be produced. The vessel is then opened and the water removed from the condensate, which is thereafter again heated. After this last drying operation the soft and sticky condensate is mixed with one or more of the cellulose esters, such as cellulose formate, acetate, butyrate, palmitate or other fatty acid ester. This operation is preferably effected in a mixing apparatus which is slightly heated, and the cellulose compound or compounds is or are comminuted to insure the production of a homogeneous mass. A solvent, in which both the condensate and cellulose compounds are soluble, such, for instance, as dichlorethylene, trichlorethylene, dichlorbenzene, acetone, or carbon tetrachlorid, is then added. The product, when reduced to the necessary consistency by the above named solvents can, with the addition of the required pigment, be used as a paint.

If desired jelutong resin or other rubber resin, as well as the so-called semi-resins, which are hydrocarbons obtained from guttapercha, balata and similar trees, or rubber, particularly rubber containing a large amount of resin, guttapercha or balata or rubber-like substances may be added to the carbolic acid or other phenols, as these act as solvents for such resins and rubber or rubber-like substances, altering them to such an extent that they lose their excessive stickiness and acquire other characteristics in the condensation products.

In the case of the manufacture of varnishes according to the present invention carbolic acid or other suitable phenols with the addition of suitable compounds of a poisonous nature would be used in conjunction with formaldehyde or para-formaldehyde together with bleaching bodies or agents such as sulfurous acid either by itself or in conjunction with other substances, which will produce substantially colorless condensation products. The condensing medium need not be concentrated, weak solutions of from one to ten per cent. being strong enough. As in the case of paints water is removed from the condensate and the latter afterward heated to remove any remaining moisture. The condensate is then mixed with one or more cellulose esters of the fatty acids. The product is then dissolved in carbon tetrachlorid, chlorbenzol, tetrachlorethane, perchlorethylene, pentachlorethane, a solution of hexachlorethane, or mixtures of these or other suitable solvents.

The improved paints and varnishes will be found to be superior to ordinary paints and varnishes as they are absolutely water and acid proof and are not affected by the action of the atmosphere. Further as the improved paints contain ingredients which are poisonous to barnacles and the like they are especially suitable for painting the submerged parts of vessels.

Having now described my invention what I have invented and desire to secure by Letters Patent of the United States is as follows:—

1. As a new article of manufacture, a base for anti-fouling varnishes and paints comprising the product of condensation of a phenol and formaldehyde, with which is combined chemically a poisonous metallic substance.

2. A process for the production of a base for anti-fouling varnishes and paints, consisting in mixing a phenol and formaldehyde, adding a salt of a poisonous nature to the mixture, heating it to produce condensation, and to effect the chemical combination of the poisonous body with the condensed product, and adding to the condensed product a solvent thereof.

3. A process for the production of a base for anti-fouling varnishes and paints, consisting in mixing a compound of a poisonous nature with a phenol, adding formaldehyde to the mixture and heating to produce a condensate of a resinous nature, wherein the poisonous body is chemically combined with the condensate, adding a cellulose ester to the said condensate, and then adding a solvent that will dissolve the cellulose ester and the said condensate.

4. A process for the production of a base for anti-fouling varnishes and paints, consisting in mixing a phenol with a condensing agent and with a salt of arsenic, heating the mixture to produce a condensation product chemically combined with the arsenic, and dissolving the product in a solvent.

5. A process for the production of a base for anti-fouling varnishes and paints, consisting in mixing a phenol with a condensing agent and with a salt of arsenic, heating the mixture to produce a condensation product chemically combined with the arsenic, adding to the product a cellulose ester, and dissolving the product in a solvent.

6. As a new article of manufacture, a base for anti-fouling varnishes and paints, comprising a condensation product of a phenol chemically combined with a salt of arsenic.

In testimony whereof I have signed my name to this specification in the presence of two subscribing witnesses.

LOUIS COLLARDON.

Witnesses:
ARTHUR F. ENNIS,
H. D. JAMESON.